(12) United States Patent
Chelaidite et al.

(10) Patent No.: US 9,669,817 B2
(45) Date of Patent: Jun. 6, 2017

(54) MAGNETIC CLUTCH FOR A DC MOTOR

(71) Applicant: AKEBONO BRAKE INDUSTRY CO., LTD, Chuo-ku, Tokyo (JP)

(72) Inventors: Galus Chelaidite, South Lyon, MI (US); Aurelian Bahmata, South Lyon, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/938,133

(22) Filed: Nov. 11, 2015

(65) Prior Publication Data
US 2016/0214580 A1 Jul. 28, 2016

Related U.S. Application Data

(60) Provisional application No. 62/108,125, filed on Jan. 27, 2015.

(51) Int. Cl.
| | | |
|---|---|---|
| *B60L 7/00* | (2006.01) | |
| *B60T 13/74* | (2006.01) | |
| *F16D 121/24* | (2012.01) | |
| *F16D 125/46* | (2012.01) | |
| *F16D 127/00* | (2012.01) | |
| *F16D 129/06* | (2012.01) | |

(52) U.S. Cl.
CPC ........ *B60T 13/741* (2013.01); *F16D 2121/24* (2013.01); *F16D 2125/46* (2013.01); *F16D 2127/00* (2013.01); *F16D 2129/065* (2013.01)

(58) Field of Classification Search
CPC ....... B60T 1/062; B60T 17/002; F16D 63/002
USPC .............. 188/129, 134, 156–164; 192/70.12, 192/84.94, 113.34, 113.36
See application file for complete search history.

(56) References Cited

U.S. PATENT DOCUMENTS

| | | | | |
|---|---|---|---|---|
| 2,614,668 A | * | 10/1952 | Waderlow | F16D 37/02 192/12 D |
| 2,827,135 A | * | 3/1958 | Sorchy | F16D 55/28 188/134 |
| 3,128,400 A | * | 4/1964 | Hanns | B25B 21/02 173/93.6 |

(Continued)

OTHER PUBLICATIONS

EEAMODS 2011—Paper 060, Achieving High Electric Motor Efficiency, John Petro, 12 pages.

*Primary Examiner* — Christopher Schwartz
(74) *Attorney, Agent, or Firm* — The Dobrusin Law Firm, P.C.

(57) ABSTRACT

A device for a brake system comprises a rotating plate including magnets having a first polarity. The rotating plate engages an output shaft of a motor. The device includes a non-rotating plate including magnets, one or more of which have the first polarity and one or more of which have a second polarity. The non-rotating plate moves axially between an engaged position and a non-engaged position. In the engaged position, the magnets in the rotating plate magnetically attract the one or more magnets in the non-rotating plate with the second polarity so that non-rotating plate moves into contact with the rotating plate. In the non-engaged position, the magnets in the rotating plate magnetically repel the one or more magnets in the non-rotating plate with the first polarity so that the non-rotating plate moves out of contact with the rotating plate and thus rotation of the rotating plate is allowed.

20 Claims, 7 Drawing Sheets

(56) References Cited

U.S. PATENT DOCUMENTS

| | | | |
|---|---|---|---|
| 3,425,529 A * | 2/1969 | Hayashi | F16D 27/112 |
| | | | 192/84.94 |
| 4,152,617 A * | 5/1979 | Janson | H02K 49/00 |
| | | | 310/103 |
| 5,238,095 A * | 8/1993 | Pedu | H02K 49/065 |
| | | | 188/267 |
| 5,334,898 A | 8/1994 | Skybyk | |
| 6,072,256 A | 6/2000 | Shon et al. | |
| 6,328,142 B1 * | 12/2001 | Kuwahara | B60L 7/003 |
| | | | 188/158 |
| 6,492,753 B2 | 12/2002 | Zepp et al. | |
| 6,617,746 B1 | 9/2003 | Maslov et al. | |
| 6,948,597 B2 * | 9/2005 | Kuwahara | H02K 49/046 |
| | | | 188/158 |
| 7,385,332 B2 | 6/2008 | Himmelmann et al. | |
| 8,138,696 B2 | 3/2012 | Vanderelli et al. | |
| 8,344,571 B2 | 1/2013 | Lee | |
| 2011/0083935 A1 * | 4/2011 | Katano | F16D 27/004 |
| | | | 192/84.31 |
| 2012/0169161 A1 | 7/2012 | Woo | |
| 2013/0049509 A1 | 2/2013 | Shin | |
| 2013/0186726 A1 * | 7/2013 | Collins | F16D 27/004 |
| | | | 192/84.9 |
| 2013/0257212 A1 | 10/2013 | Marvin et al. | |
| 2015/0308528 A1 | 10/2015 | Ambs et al. | |
| 2015/0308529 A1 | 10/2015 | Ambs et al. | |

* cited by examiner

MAGNETIC CLUTCH FOR A DC MOTOR

FIELD

The present teachings generally relate to a brake system and more specifically to a magnetic clutch for a motor in an electromechanical parking brake system.

BACKGROUND

The present teachings are predicated upon providing an improved electromechanical parking brake system for a vehicle. Generally, an electromechanical parking brake system may include one or more brake pads and one or more Motor-on-Caliper units (MOC). The MOC may include a motor that is configured to move one or more brake pads against a rotor to create a clamping force (i.e., a parking brake force). To maintain the clamping force when electrical power to the electromechanical parking brake system is removed or interrupted, a low efficiency self-locking stage exists in the drive train of the electromechanical parking brake system. It is possible to increase the overall efficiency of the electromechanical parking brake system such that less energy is required to maintain the clamping force once the clamping force is generated. To maintain the clamping force, however, the MOC may need to be always energized because the low efficiency self-locking stage in the electromechanical parking brake system has been made more efficient and its self-locking property has been eliminated. In other words, a voltage and/or a current supply to the motor may be required to maintain the clamping force (i.e., to maintain the position of the one or more brake pads against the rotor) or else the electromechanical parking brake system may back drive, which may result in an undesirable and premature release of the clamping force. It may therefore be desirable to provide a magnetic clutch to lock the motor once the electromechanical parking brake system has created the clamping force (i.e., once the one or more brake pads have been moved against the rotor) so that the clamping force can be maintained without supplying a voltage and/or current to the motor. It may also be desirable to provide a magnetic clutch to change the efficiency of the MOC to be high efficiency when the motor is running (i.e., while the motor is moving the one or more brake pads towards or away from the rotor), and to be low efficiency when the motor is stopped (i.e., to maintain the clamping force).

SUMMARY

The present teachings provide a device for an electromechanical brake system comprising an electric motor and a rotating plate with integrated magnets, thereafter called "rotating magnets" with a first pole. The rotating plate is configured to engage an output shaft of a motor. The brake system also includes a non-rotating plate with integrated magnets, thereafter called "non-rotating magnets", one or more of which are arranged facing the first pole arranged to face with the second pole. The non-rotating plate moves axially between an engaged position and a non-engaged position. In the engaged position, the rotating magnets magnetically attract the one or more of the non-rotating magnets such that the non-rotating plate moves into contact with the rotating plate. In the non-engaged position, the rotating magnets magnetically repel the one or more non-rotating magnets so that the non-rotating plate moves out of contact with the rotating plate so that rotation of the rotating plate is allowed.

The present teachings also provide a brake system. The brake system comprises a motor including an output shaft configured to rotate; a rotating plate attached to the output shaft and including north pole facing rotating magnets; and a non-rotating plate including non-rotating magnets. One or more of the north facing non-rotating magnets repel the north pole facing rotating magnets, and one or more south pole facing non-rotating magnets attract the north pole facing rotating magnets. The brake system also includes anti-rotation features; and a housing containing the non-rotating plate, the motor, the output shaft, and the rotating plate. The housing includes corresponding anti-rotation grooves engaging the anti-rotation features of the non-rotating plate preventing rotation of the non-rotating plate. When the output shaft rotates the rotating plate and the north pole facing rotating magnets intermittently align with the north pole facing non-rotating magnets, the non-rotating plate is urged away from the rotating plate toward a non-engaged position. When the north pole facing rotating magnets align with the one or more south pole facing non-rotating magnets, the non-rotating plate is urged towards the rotating plate toward an engaged position.

The present teachings further provide brake system. The brake system comprises a motor including an output shaft configured to rotate; and a rotating plate that is rotatable with the output shaft. The rotating plate includes rotating magnets with a first polarity. The brake system also includes a non-rotating plate including: one or more north pole facing non-rotating magnets magnetically repelling the north pole facing rotating magnets; one or more south pole facing non-rotating magnets magnetically attracting the north pole facing rotating magnets, or one or more ferromagnetic metal disks, or both. The non-rotating plate also includes anti-rotation features; and an orifice. A housing contains the motor, the output shaft, the rotating plate, and the non-rotating plate. The housing includes anti-rotation grooves engaging the anti-rotation features of the non-rotating plate so that the non-rotating plate is restricting from rotating. The brake system includes a brake caliper including one or more brake pads. When the output shaft rotates the rotating plate, the first poles of the rotating magnets align with the first poles of the one or more non-rotating magnets so that the non-rotating plate axially moves to a non-engaged position. As the non-rotating plate moves to the non-engaged, air located in an air chamber between the non-rotating plate and the housing is moved at least partially through the orifice towards the rotating plate. When the first poles of the rotating magnets align with the second poles of the one or more non-rotating magnets, ferromagnetic metal disks, or both the non-rotating plate axially moves to an engaged position. When the non-rotating plate is in the non-engaged position, one or more brake pads are configured to move relative to a brake rotor. When the non-rotating plate is in the engaged position one or more brake pads are restricted from moving relative to the rotor.

Further yet, the present teachings provide a magnetic clutch to change the efficiency of an MOC to be high efficiency when the motor is running (i.e., while the motor is moving the one or more brake pads towards or away from the rotor), and to be low efficiency when the motor is stopped (i.e., to maintain the clamping force).

Still further yet, the present teachings provide a magnetic clutch to lock the motor once the electromechanical parking brake system has created the clamping force (i.e., once the one or more brake pads have been moved against the rotor) so that the clamping force can be maintained without supplying a voltage and/or current to the motor.

The present teachings also provide a device for a brake system. The device comprises a rotating plate including rotating magnets with a first pole. The rotating plate is configured to engage an output shaft of a motor. The device comprises a non-rotating plate including non-rotating magnets, disks, or both. One or more of the non-rotating magnets include the first pole and one or more of the non-rotating magnets include a second pole. The non-rotating plate moves axially along the axis between an engaged position and a non-engagement position. In the engaged position, the rotating magnets are generally aligned with and magnetically attract the second poles of the one or more non-rotating magnets, disks, or both so that non-rotating plate moves into contact with the rotating plate and rotation of the rotating plate is inhibited. In the non-engaged position, the rotating magnets are generally aligned with and magnetically repel the first poles of the one or more non-rotating magnets so that the non-rotating plate moves out of contact with the rotating plate and rotation of the rotating plate is allowed.

The present teachings also provide a brake system. The brake system comprises a motor including an output shaft configured to rotate; a rotating plate attached to the output shaft and including north pole facing rotating magnets; and a non-rotating plate including one or more north pole facing non-rotating magnets magnetically repelling the north pole facing rotating magnets. The brake system also comprises one or more south pole facing non-rotating magnets magnetically attracting the north pole facing rotating magnets, or one or more ferromagnetic metal disks, or both; anti-rotation features; and a housing containing the non-rotating plate, the motor, the output shaft, and the rotating plate. The housing includes corresponding anti-rotation grooves engaging the anti-rotation features of the non-rotating plate preventing rotation of the non-rotating plate. When the output shaft rotates the rotating plate and the north pole facing rotating magnets align with the one or more north pole facing non-rotating magnets, the non-rotating plate moves away from the rotating plate to a non-engaged position. When the north pole facing rotating magnets align with the one or more south pole facing non-rotating magnets, ferromagnetic metal disks, or both, the non-rotating plate moves towards the rotating plate to an engaged position.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. The present teachings claim priority to U.S. Provisional Patent Application No. 62/108,125, filed on Jan. 27, 2015, the teachings of which are expressly incorporated by reference herein for all purposes.

The teachings herein provide a brake assembly. The brake assembly may include an electromechanical parking brake system that may function to create a friction force, which may be a clamping force (i.e., a parking brake force). The clamping force may be a force that prevents rotation of a rotor, prevents movement of the vehicle, or both when the vehicle is in a stopped or parked position. The brake assembly may be an opposing brake system (i.e., a fixed caliper brake system) or a floating brake system (i.e., a floating caliper).

The brake caliper may function to house the components of the brake assembly, the electromechanical parking brake system, or both. The brake caliper may function to provide for the movement of one or more brake pads, or, preferably, two or more brake pads relative to a rotor. The brake caliper may move during a brake apply (i.e., a floating caliper), or the brake caliper may be fixed so that the brake caliper does not move during a brake apply (i.e., a fixed caliper). The brake caliper may be connected to a knuckle or a support structure of a vehicle. The brake caliper may include one or more support brackets configured to engage the one or more brake pads. The one or more support brackets may be arranged on the rotor so that one or more brake pads are located on an inboard side of the rotor and one or more brake pads are located on an outboard side of the rotor.

The rotor may cooperate with the electromechanical parking brake system to create a friction force, a clamping force, or both. The rotor may be generally circular and may extend through a brake caliper; may be partially surrounded by a brake caliper; or both. Preferably, the rotor extends at least partially between or within the brake caliper so that the friction material of one or more brake pads faces an inboard side of the rotor, and the friction material of one or more brake pads faces an outboard side of the rotor. When the electromechanical parking brake system is actuated, the friction material of the one or more brake pads is pushed into contact with, or caused to engage one or more sides of the rotor to create the clamping force so that the vehicle is restricted or prevented from moving. When the electromechanical parking brake system is released or disengaged, the clamping force holding the friction material of the one or more brake pads against the rotor is released so that the one or more brake pads can move away from the one or more sides of the rotor so that the vehicle can move.

Once moved into contact with the rotor, the one or more brake pads may function to create a friction force, a clamping force, or both. The clamping force may function to lock, maintain, and/or prevent movement of a vehicle when the vehicle is stopped or parked. The one or more brake pads may include one or more ears or projections, which may engage the brake caliper, the support bracket, or both. The one or more brake pads may be moved relative to the brake caliper, the support bracket, the rotor, or a combination thereof. The one or more brake pads may be moved axially relative to the brake caliper, the support bracket, the rotor, or a combination thereof. The one or more brake pads may include one or more first brake pads configured to move towards and away from one side of the rotor (i.e., an inboard side) and one or more second brake pad configured to move towards and away from an opposing side the rotor (i.e., an outboard side). The one or more brake pads may include a friction material and a pressure plate. The friction material may include one or more non-metallic materials, semi-metallic materials, fully metallic materials, and ceramic materials. The friction material may be slotted, may include grooves, or both. The friction material may face the rotor so that when the brake pads are moved against the rotor, a friction force, a clamping force, or both is created to restrict the vehicle from moving. The pressure plate may be located opposite the friction material. A motor gear unit (MGU), one or more linkages, one or more piston assemblies, or a combination thereof may interface with the pressure plate so that the brake pad is moved towards or away from the rotor.

The one or more motor gear units (MGU) may function to move the one or more brake pads against the rotor to create the clamping force and move the one or more brake pads away from the rotor to release the clamping force. The one or more motor gear units may function to directly or indirectly move the one or more brake pads towards and/or away from the rotor via a linkage, one or more piston assemblies, or both. The one or more motor gear units may include one or more gears and one or more motors. The one or more gears that may function to transfer, increase, decrease, or a combination thereof torque generated by the motor. Together or individually, the one or more motors and gears may generate a torque sufficient to move the one or more brake pads relative to a rotor. The one or more motors may be an electric motor. The one or more motors and/or gears may generate a torque sufficient to move the one or more brake pads against a rotor to create a clamping force. The clamping force may be sufficient to maintain the one or more brake pads against a rotor so that the vehicle does not move or is restricted from moving. The one or more motors gear units may include a housing.

The housing may function to house, contain, and/or attach the motor gear unit (MGU) to the brake caliper. The housing may be integrally formed with the caliper, or may be attached thereto with one or more housing attachment features. The housing may be integrally formed with one or more calipers located at a front end of a vehicle, one or more calipers located at a rear end of a vehicle, or a combination thereof. The housing may be attached to the brake caliper with mechanical fasteners such as bolts, nuts, screws, rivets, welding, or a combination thereof. The housing may be a unitary member, or may be formed from two or more mating components. The housing may include a housing body and a housing cap. The housing cap may be removeably or fixedly attached to the housing body via housing and cap attachment features. The housing and cap attachment features may be any feature configured to couple and/or attach the housing and the cap. The housing and the cap may include mating threaded and/or non-threaded bores for receiving bolts, screws, or both; quick-connect locking features; mating threaded portions; welds; rivets; or a combination thereof. The housing, the cap, or both may be generally hollow, cylindrical members and may include an inner wall surface and an inner cap surface, respectively. The inner wall surface, the inner cap surface, or both may include a tapered portion, or an area where the cross section and/or the inner diameter of the housing, the cap, or both is smaller than other portions of the housing and the cap, respectively. The tapered portion may be an indent formed in an outer surface of the housing, the cap or both, which may cause the inner surface to deflect or deform inwardly; may be integrally formed with the inner surface of the housing, the cap, or both; or may be mechanically attached to the inner surface via one or more mechanical fasteners. The housing, the cap, or both may include one or more anti-rotation features (i.e., male projections, female grooves, or both) configured to engage mating features on the motor, the magnetic clutch, or both to restrict or prevent rotational movement of the motor, at least some portions of the magnetic clutch, or both. The anti-rotation features may extend about and/or around an inner diameter or inner surface of the housing, the housing cap, the housing body or a combination thereof. The anti-rotation features may be evenly spaced around the housing, the housing cap, the housing body (i.e., the anti-rotation features may be spaced apart 90 degrees, 120 degrees, 90 degrees, 45 degrees), may be randomly spaced apart, or a combination of both.

The housing, the housing cap, the inner cap surface, or a combination thereof may include a spike that may be a projection, a needle, a plug, the like, or a combination thereof. The spike may cooperate with the orifice to control how much air is moved from the air chamber above the non-rotating plate to the air gap between the non-rotating plate and the rotating plate, how fast the air is moved from the air chamber to the air gap, or both, or vice versa. The spike may function to restrict, block, vary, or a combination thereof air passing through the orifice when the non-rotating plate moves from the engaged position to the non-engaged position, from the non-engaged position to the engaged position, or both. The spike may extend form an inner surface of the housing, the housing cap, the inner cap surface, or a combination thereof towards the non-rotating plate. The spike may be positioned and sized so that the spike at least partially fits into, contacts, engages, seals off, or a combination thereof the orifice. The spike may have a size, diameter, and/or a width that is generally the same size or slightly larger than the orifice so that the spike has an interference fit with the walls of the orifice when the non-rotating plate is in the non-engaged position, in a position between the engaged position and the non-engaged position, or both. The spike may have a size, diameter or width that is the smaller than the orifice so that the walls or edges of the spike fit within the walls of the orifice and do not contact the walls when the non-rotating plate is in the non-engaged position, in a position between the engaged position and the non-engaged position, or both. The spike may be one or more spikes that fit into, contact, engage, seal, or a combination thereof or more orifices in the non-rotating plate. The spike may have a shape that is generally conical, cylindrical, spherical, or an irregular shape, and may include walls or edges that are straight, tapered, drafted, irregular, variable, or a combination thereof. The length of the spike may be any length, that is, the length may be shorter so that the spike does not project into or through the orifice when the non-rotating plate is in the non-engaged position (i.e., the spike may be a seal or a flap, or a shorter projection), or the length may be longer so that the spike project into or through the orifice when the non-rotating plate is in the non-engaged position. The spike may have a distal end that is sharp, flat, rounded, irregular, or a combination thereof.

The motor may function to generate a force to move the one or more brake pads towards or away from the rotor. The motor may function to generate torque sufficient to move the one or more brake pads against the rotor to create a clamping force so that the vehicle is restricted or prevented from moving when the vehicle is stopped or parked. The motor may be configured to not back drive, or may be restricted from back driving once the clamping force is established so that the clamping force can be maintained. The one or more motors may be a DC motor. The one or more motors may be an electric motor. The one or more motors may be a brush motor or a brushless motor. The one or more motors may be a series wound motor, a shunt wound motor, a compound wound motor, a separately exited motor, a servomotor, or a permanent magnet motor. The motor may have a stall torque that is greater than 0.1 N·m, greater than 0.2 N·m, greater than 0.4 N·m, preferably 0.5 N·m. The motor may have a stall torque that is less than 1 N·m, and less than 0.7 N·m. The motor may be connected directly to the one or more brake pads, or the motor may be connected to the one or more brake pads via one or more gears, linkages, piston assemblies, nuts, screws, spindles, drive trains, or a combination thereof. The motor may be received in the housing, the housing cap, the housing body, or a combination thereof. The motor may be restricted from moving or rotating when received in the housing, the housing cap, the housing body, or a combination thereof via one or more anti-rotation features, such as male and/or female grooves, projections, mechanical fasteners, the like, or a combination thereof. The motor may be press-fit or fit via an interference fit into the housing. The motor may cause an output shaft to rotate in a first direction (i.e., clockwise or counter-clockwise), a second direction (i.e., clockwise or counter-clockwise), or both.

The output shaft may rotate in a first direction about a longitudinal axis so that the one or more brake pads move towards the rotor. The longitudinal axis may be an axis that is generally or substantially perpendicular to the rotor, parallel to the motor, the piston, an axis of the piston bore, or a combination thereof. The output shaft is configured to rotate in a second, opposite direction about the longitudinal axis so that the one or more brake pads move away from the rotor. The output shaft may be connected to one or more gears which may function to increase, decrease, and/or transfer torque generated by the motor. The output shaft may be generally circular, keyed, irregular, or a combination thereof. For example, the output shaft may be cylindrical, tapered, star shaped, or a combination thereof; may include teeth and/or splines; may include one or more flat edges and one or more rounded edges; or a combination thereof. The output shaft may engage a rotating plate of the magnetic clutch. A mechanical lock may engage the output shaft, the rotating plate, or both so that the rotating plate rotates with the output shaft, but does not move independently of the output shaft. In other words, the rotating plate may be restricted from rotating in a direction opposite the direction that the output shaft is rotating; the rotating plate may be restricted from moving axially along the output shaft relative to the longitudinal axis; the rotating plate may be restricted from moving radially about the output shaft relative to the longitudinal axis; or a combination thereof. At least a portion of the magnetic clutch may engage at least a portion of the output shaft.

The magnetic clutch may function to maintain an axial, cross-car position of the one or more brake pads relative to the rotor. The magnetic clutch may function to engage and lock the motor so that the one or more brake pads do not move relative to the rotor. The magnetic clutch may function to engage and lock the motor so that the one or more brake pads do not move relative to the rotor once the clamping force is created. The magnetic clutch may function to maintain the clamping force once the electromechanical parking brake is engaged. The magnetic clutch may function to prevent a back drive of the motor, the MGU, or both so that the electromechanical parking brake, the clamping force, or both is not prematurely or unintentionally released (i.e., prevented from moving the one or more brake pads away from the rotor). The magnetic clutch may function to prevent a back drive of the motor without having to supply a voltage and/or a current to the motor. The magnetic clutch may function to prevent the electromechanical parking brake, the clamping force, or both from prematurely or unintentionally engaging (i.e., prevented from moving the one or more brake pads towards the rotor). The magnetic clutch may maintain the one or more brake pads against the rotor once the parking brake is actuated so that the vehicle is restricted from moving once the vehicle is stopped or parked. The magnetic clutch may function to change the efficiency of a motor, a motor gear unit (MGU) or both so that the MGU is high efficiency while running (i.e., while the motor is moving the one or more brake pads towards or away from the rotor), and low efficiency while the motor is stopped (i.e., to maintain the clamping force of the brake pads against the rotor). Generally, the magnetic clutch may include a rotating plate and a non-rotating plate.

The rotating plate may function to engage the output shaft of the motor and rotate in a first direction, an opposing second direction, or both along with the output shaft. The rotating plate may include a center bore configured to engage the output shaft of the motor. The center bore may be circular and may engage a generally circular output shaft, or the center bore may be keyed (i.e., star shaped, oblong, may include teeth, may include one or more flat edges, etc.) and engage an output shaft with mating features. The center bore may be press fit onto a tapered output shaft forming an interference fit. An O-ring, a seal, or both may be disposed between the motor and the rotating plate. The O-ring, the seal, or both may provide a seal between the rotating plate and the motor so that the rotating plate is restricted from axially moving along the longitudinal axis and contacting the motor, the housing, or both. The rotating plate may be restricted from rotating in a direction opposite the direction that the output shaft is rotating; the rotating plate may be restricted from moving axially along the output shaft relative to the longitudinal axis; the rotating plate may be restricted from moving radially about the output shaft relative to the longitudinal axis; or a combination thereof. The rotating plate may be a generally flat, circular disk or member. Preferably, the rotating plate is fabricated from a light material having requisite strength properties. The rotating plate may be fabricated aluminum or plastic. Preferably, the rotating plate is fabricated from a non-magnetic material. The rotating plate (and also the non-rotating plate) may include one or more magnet seats.

The one or more magnet seats may function to receive one or more magnets disks, or both. The rotating plate and the non-rotating plate may each include one or more magnet seats. Preferably, the rotating plate includes two magnet seats, but may include any number of magnet seats (i.e., three, four, five, or even eight or more magnet seats). The non-rotating plate preferably includes eight magnet seats, but, may also include any number of magnet seats (i.e., four, six, eight, ten, or even twelve or more magnet seats). Each of the magnet seats may be configured to receive one or more magnets, disks, or both. The magnet seats may be generally circular, but can be any shape to match the shape of the magnets, disks, or both. Accordingly, square, oval, rectangular, and diamond shaped, seats may be envisioned, for example. The magnet seats may be sized accordingly so that the magnets, disks, or both can be press-fit (i.e., an interference-fit) into the magnet seats. Mechanical fasteners may be used to retain the magnets, disks, or both in the magnet seats (i.e., bolts, screws, rivets, adhesives, or a combination thereof). The magnet seats may be sized so that when the magnets, disks, or both are received into the magnet seats, the magnets, disks, or both are generally flush with a rotating plate surface. One or more of the magnet seats may be through bores or apertures extending through the rotating plate relative to the longitudinal axis, or may only partially extend through the rotating plate. In an assembled position, the magnet seats may receive the magnets so that one or more poles extend away from the motor, one or more poles face the motor, or a combination of both. The magnet seats may be spaced about the plates so that the magnets, disks, or both are equally spaced about the longitudinal axis, the center bore, the output shaft of the motor, or a combination thereof, or may be randomly spaced thereabout, or both.

The non-rotating plate may function to engage the rotating plate (and therefore also the output shaft and the motor) to lock, restrict, and/or prevent rotation of the motor. The non-rotating plate may function to disengage the rotating plate (and therefore also the output shaft and the motor) so that the rotating plate and the output shaft can be free to rotate. The non-rotating plate may be restricted from rotating about the longitudinal axis. The non-rotating plate may include one or more anti-rotation features or grooves that may restrict or prevent the non-rotating plate from rotating about the longitudinal axis. The non-rotating plate may include one or more arms, projections, teeth, or a combination thereof that may engage mating anti-rotation features, grooves, or both in the housing, the housing body, the housing cap, or a combination thereof so that the non-rotating plate is restricted from rotating. The one or more arms, projections, anti-rotation features, or a combination thereof may extend radially from the non-rotating plate. The one or more anti-rotation features may be equally spaced around the non-rotating plate (i.e., the anti-rotation features may be spaced apart 90 degrees, 120 degrees, 90 degrees, 45 degrees), may be randomly spaced apart, or both. While the non-rotating plate may move axially relative to the longitudinal axis towards or away from the rotating plate, the non-rotating plate may be restricted from moving radially relative to the longitudinal axis. The non-rotating plate may be a generally flat, circular member. Preferably, the non-rotating plate is fabricated from a light material having requisite strength properties. The rotating plate may be fabricated aluminum or plastic. Preferably, the rotating plate is fabricated from a non-magnetic material. The non-rotating plate may include one or more grooves or a notches around a circumference thereof that may be configured to engage one or more O-rings, a seals, or both. The O-ring(s), seals(s), or both may function to engage at least a portion of the inner surface of the cap, the inner surface of the housing, the tapered portion, or a combination thereof. The one or more O-rings, the seals or both may engage a tapered portion of the inner surface of the housing when the non-rotating plate is in a non-engaged position (i.e., when the motor is not locked, restricted, or prevented from rotating). The one or more O-rings, seals, or both may disengage the tapered portion when the non-rotating plate is in an engaged position (i.e., when the motor is locked, restricted, and/or prevented from rotating), or when the non-rotating plate is moving from the engaged position to the non-engaged position, and from the non-engaged position to the non-engaged position. The non-rotating plate may include one or more, two or more, six or more, preferably eight or more, or even 10 or more magnet seats receiving magnets, metal disks, or both. The metal disks may be made form a ferromagnetic material that is generally magnetically attracted to one or more magnets. The non-rotating plate may include a lip. When the non-rotating plate moves and engages the rotating plate in the engaged position, the lip may engage at least a portion of the rotating plate. In the engaged position, the lip may function as a friction clutch, a conical clutch, or both to slow, stop, and/or prevent the rotating plate (and therefore the output shaft of the motor) from rotating when the motor is generating a low torque (i.e., once the motor output torque is less than the magnetic attraction between the magnets in the non-rotating and rotating plates). The lip, the friction clutch, the conical clutch, or a combination thereof may disengage once the motor, the MGU, or both generate a torque that is greater than the magnetic attractive forces between the magnets in the rotating plate and the non-rotating plate. The non-rotating plate, the rotating plate, or both may include any other feature(s) so that a friction clutch, a conical clutch, or both are created between the plates. For example, either or both of the rotating and non-rotating plates may include a conical surface, an undercut surface, a drafted or angled surface, or a combination thereof. The non-rotating plate may include one or more orifices.

The one or more orifices may function to provide a passageway, opening, or both through the non-rotating plate. The one or more orifices may function to provide for fluid communication (i.e., air) between an air chamber formed between the non-rotating plate and an inner surface of the housing, the housing cap, or both, and an air gap formed between the rotating and non-rotating plates. The one or more orifices may cooperate with the one or more spikes to control how much air is moved from the air chamber to the air gap, how fast the air is moved from the air chamber to the air gap, or both. The one or more orifices may function to provide for the passage of air located between the non-rotating plate and the inner cap surface, the housing cap, or both towards the rotating plate when/as the non-rotating plate moves from an engaged position to a non-engaged position. The one or more orifices may be one orifice that is generally centered on the non-rotating plate relative to the longitudinal axis that the non-rotating plate axially moves relative to, or the one or more orifices may be a plurality of orifices spaced about the non-rotating plate. The orifice may be generally centered on the non-rotating plate, relative to a longitudinal axis, and the magnet seats may be disposed around the orifice. The one or more orifices may be a passageway through any part or portion of the non-rotating plate so that air can be moved, transferred, passed, forced, or a combination thereof from one side of the non-rotating plate to the opposing side of the non-rotating plate. The one or more orifices may include one or more edges that are straight, tapered, conical, drafted, variable, or a combination thereof relative to the longitudinal axis. The side of orifice may be any size that is sufficient to provide for the passage of air through the non-rotating plate. The orifice may be variable; that is, when the rotating plate and the non-rotating plate are in the non-engaged position, the orifice may be at least partially closed or fully closed. When the rotating plate and the non-rotating plate are in the engaged position, the orifice may be at least partially open or fully open. When the rotating plate and the non-rotating plate are in a position between the engaged and non-engaged position, the orifice may be partially open, partially closed, or both. When the non-rotating plate is in the non-engaged position, at least a portion of the housing, the housing cap, the inner cap surface, a spike, or a combination thereof may engage at least a portion of the orifice to close, or at least partially close the orifice and restrict the amount of air passing there through. As the non-rotating plate moves from the engaged position to the non-engaged position, the air in the chamber may at least partially first move between the inner surface of the housing, the cap, or both and the O-ring, seal, or both disposed around the non-rotating plate towards the rotating plate before the air moves through the orifice.

The magnets may function to change the efficiency of a motor, a motor gear unit (MGU) or both so that the MGU has high efficiency while running (i.e., while the motor is moving the one or more brake pads towards or away from the rotor), and low efficiency while the motor is stopped (i.e., to maintain the clamping force and the position of the one or more brake pads against the rotor). The magnets may cooperate to lock the motor and prevent the motor from back driving so that the clamping force is not released. The magnets may generate attractive forces, which may function to move the non-rotating plate axially along the longitudinal axis towards the rotating plate so that the non-rotating plate engages the rotating plate and locks the motor so that the clamping force can be maintained. The magnets may generate repulse or repelling forces, which may function to move the non-rotating plate axially along the longitudinal axis away from the rotating plate so that the non-rotating plate disengages the rotating plate and unlocks the motor so that the clamping force can be released. The magnets may have a force of 1 lb or more, 3 lbs or more, 5 lbs or more, preferably 7 lbs. The magnets may have a force of 10 lb or less, 9 lbs or less, 8 lbs or less. The magnets may be electromagnets, permanent magnets, or both. The magnets may be neodymium iron boron (NdFeB), samarium cobalt (SmCo), alnico, ceramic or ferrite magnets, or a combination thereof. The magnets may have a north pole and an opposing south pole. The magnets may be shaped as round or rectangular bars, horseshoes, rings or donuts, disks, rectangles, multi-fingered rings, or a combination thereof. The magnets may be inserted or received into the magnet seats in the rotating plate and the non-rotating plate. Preferably, the magnet seats in the rotating plate and the non-rotating plate are the same size and shape as the magnets. The magnets may be inserted or received into the magnet seats in the rotating plate and the non-rotating plate so that the magnets generally oppose each other. The magnets may be inserted or received into the magnet seats in the rotating plate and the non-rotating plate so that the number of magnets in the non-rotating plate outnumbers the number of magnets in the rotating plate, or vice versa. The number of magnets, metal disks, ferromagnetic metal disks, or a combination thereof in the non-rotating plate may be any number, such as one or more, two or more, four or more, six or more, preferably eight or more, ten or more, or even fourteen or more. The number of magnets, metal disks, ferromagnetic metal disks or a combination thereof in the rotating plate may be any number, such as one or more, preferably two or more, four or more, six or more, or even 8 or more. The ratio of total magnets, or disks in the non-rotating plate to the number of magnets in the rotating plate may be 2:1, 6:2, 6:4, preferably 4:2, 6:2, 8:2, 8:4, 10:2, 10:4, 10:6, 14:2, 14:6, etc. The magnets may be arranged in the non-rotating plate so that one or more repelling poles (i.e., north poles or south poles) face the rotating plate, while one or more attractive poles (i.e., south poles or north poles) face away from the rotating plate. Preferably, the non-rotating plate includes four repelling poles facing the rotating plate and two attractive poles or disks facing the rotating plate. The magnets may be arranged in the rotating plate so that one or more north poles or south poles (i.e., repelling poles) face the non-rotating plate, while one or more south poles or north poles (attractive poles) face away from the rotating plate. Preferably, the rotating plate includes two repelling poles facing the non-rotating plate. The ratio of repelling magnets facing each other per full revolution of the rotating plate may be 1:3. That is, two repulsive magnets on the rotating plate and six repulsive magnets in the non-rotating plate. The ratio of repelling magnets facing each other per full revolution of the rotating plate may be 1:2. That is, two repelling magnets on the rotating plate and four repelling magnets in the non-rotating plate. The ratio of attractive magnets facing each other per full revolution of the rotating plate may be 1:1. That is, two attractive magnets on the rotating plate and two attractive magnets in the non-rotating plate. The attractive magnets in the non-rotating plate may be replaced with metal discs that are attracted by the magnets in the rotating plate. In the attractive case, the ratio of magnets in the rotating plate facing metal discs or blocks per full revolution of the rotating plate may be 1:1. That is, two magnets on the rotating plate and two metal discs in the non-rotating plate.

In the engaged position, the magnetic clutch may function to restrict and/or prevent the motor and the output shall from rotating so that the one or more brake pads cannot be moved relative to the rotor. In the engaged position, the magnetic clutch may function to maintain a clamping force created by the one or more brake pads against the rotor. Once the rotation of the output shaft is reduced to low torque (i.e., once the brake pads have almost fully or fully engaged the rotor, or once the brake pads have sufficiency moved away from the rotor), the magnetic attraction between the attractive poles in the non-rotating plate and the attractive poles in the rotating plate may align and cause the non-rotating plate to move towards the rotating plate so that the non-rotating plate engages the rotating plate. In addition, or alternatively, the magnetic attraction between the one or more ferromagnetic metal disks in the non-rotating plate and the magnets in the rotating plate may align and cause the non-rotating plate to move towards the rotating plate so that the non-rotating plate engages the rotating plate. The lip may engage at least a portion of the rotating plate (i.e., engage the friction clutch) so that the rotating plate, the output shaft, and the motor is therefore restricted from rotating. When moving from the non-engaged position to the engaged position, air located in an air gap between the non-rotating plate and the rotating plate may move or may be vented through the orifice in the non-rotating plate towards the inner surface of the housing, the housing cap, or both, or may be vented or moved between the O-ring and the inner surface of the housing, the housing cap, the housing body, or a combination thereof.

Once the parking brake is actuated and the motor is energized (i.e., once the torque generated by the motor is greater than the magnetic attractive forces between the magnets in the non-rotating and rotating plates and/or greater than the torque generated by the cone clutch), the rotating plate rotates with the output shaft and because there may be more repulsive poles than attractive poles, the repulsive forces may, on average, cause the non-rotating plate to move away from the rotating plate. Air located in an air chamber between the non-rotating plate and the inner surface of the housing cap, the housing, or both may move or be vented through the orifice towards the rotating plate, around the O-Ring, the seal, or both and the inner surface of the housing, the housing cap, or both, or a combination of both. The orifice may be sized to control how fast the air is vented from the air chamber, and thus the movement of the non-rotating plate can be controlled during both periods of attraction and repulsion while the rotating plate aligns with repelling and attractive magnets/metal discs.

In the non-engaged position, the magnetic clutch may function to allow the motor and the output shall to rotate in a first direction or a second direction so that the one or more brake pads can be moved relative to the rotor (i.e., towards the rotor to engage the parking brake or away from the rotor to disengage the parking brake). Because there may be more repulsive poles in the non-rotating plate than the rotating plate, the non-rotating plate may be forced away from the rotating plate towards the inner surface of the housing, the housing cap, or both. As the non-rotating plate moves away from the rotating plate, air located in an air chamber between the non-rotating plate and the inner surface of the housing cap, the housing, or both may move or vent around the O-ring, the seal, or both disposed around the non-rotating plate and the inner surface of the housing, the housing cap, or both. Once the non-rotating plate has sufficiency moved away from the rotating plate such that the seal or O-ring disposed around the non-rotating plate engages the tapered portion, the air may move or vent through the orifice towards the rotating plate. Alternatively, all of the air may vent between the O-ring and the inner surface of the housing and/or cap, or all of the air may vent through the orifice in the non-rotating plate.

Figure 1:
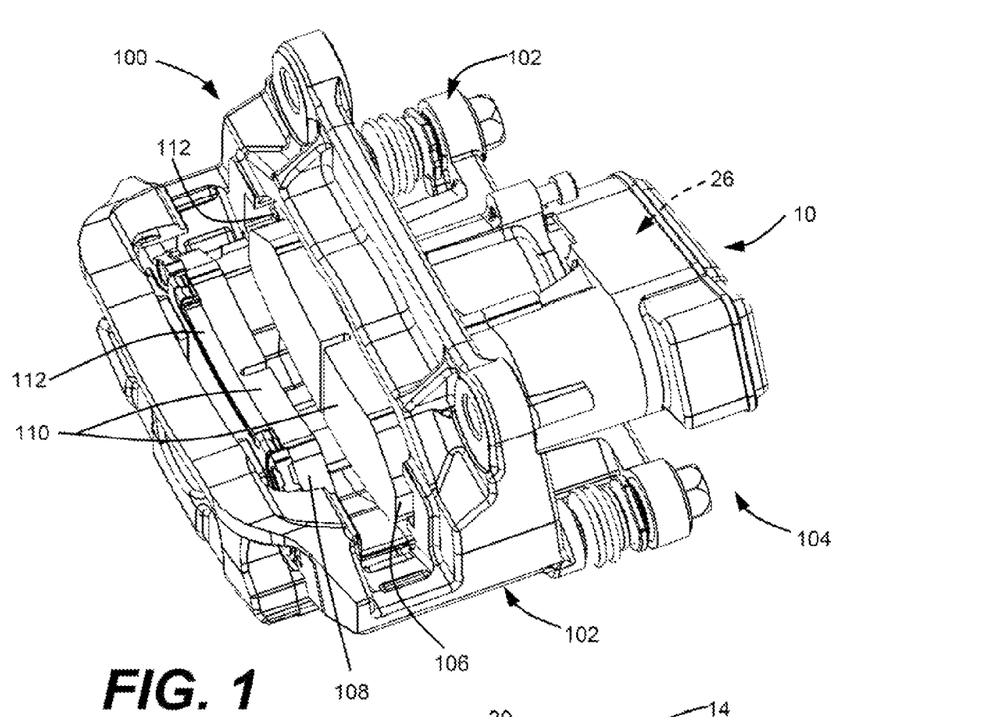
FIG. 1 is a perspective view of a brake system.

FIG. 1 illustrates a brake system 100. The brake system 100 includes a brake caliper 102 and parking brake system 104. The brake caliper 102 includes a first brake pad 106, a second brake pad 108, and a rotor extending between the first brake pad 106 and the second brake pad 108. Each of the brake pads 106, 108 includes a friction material 110 facing the rotor, and a pressure plate 112 opposite the friction material 110. The brake system 100 includes one or more piston assemblies in communication with the pressure plate 112 of the first brake pad 106. The parking brake system 104 includes a motor gear unit 10 that includes a motor 26.

Figure 2:
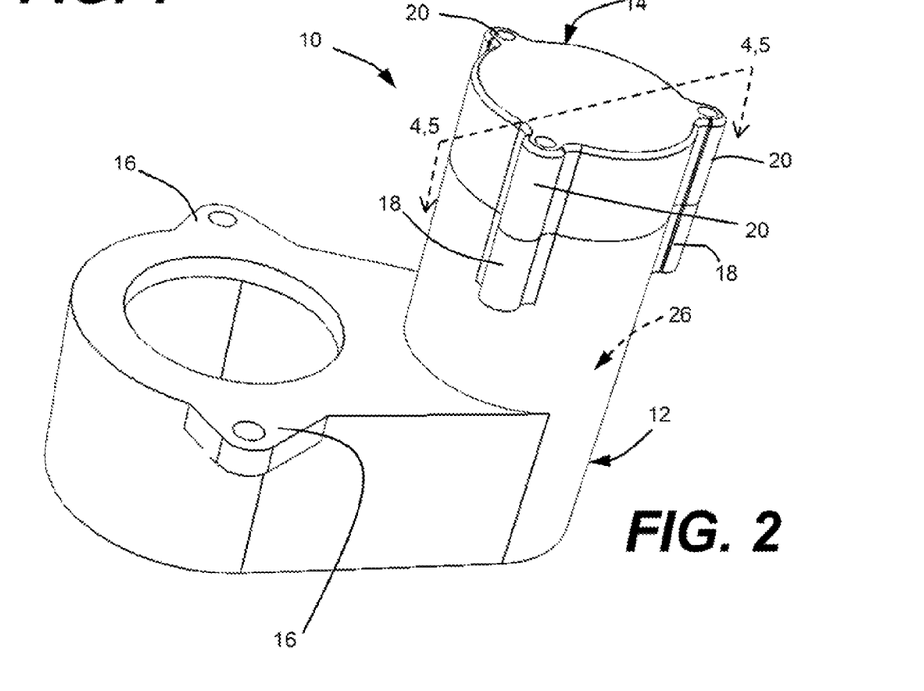
FIG. 2 is a perspective view of a motor assembly.

FIG. 2 illustrates the motor gear unit 10. The motor gear unit 10 includes a housing body 12 and a housing cap 14 containing the motor 26 within. The housing body 12 includes attachment features 16 for attaching the motor gear unit 10 to other objects or devices, such the brake caliper 102. The housing body 12 also includes housing attachment features 18 cooperating with cap attachment features 20 for coupling the housing body 12 and the housing cap 14 together.

Figure 3A:
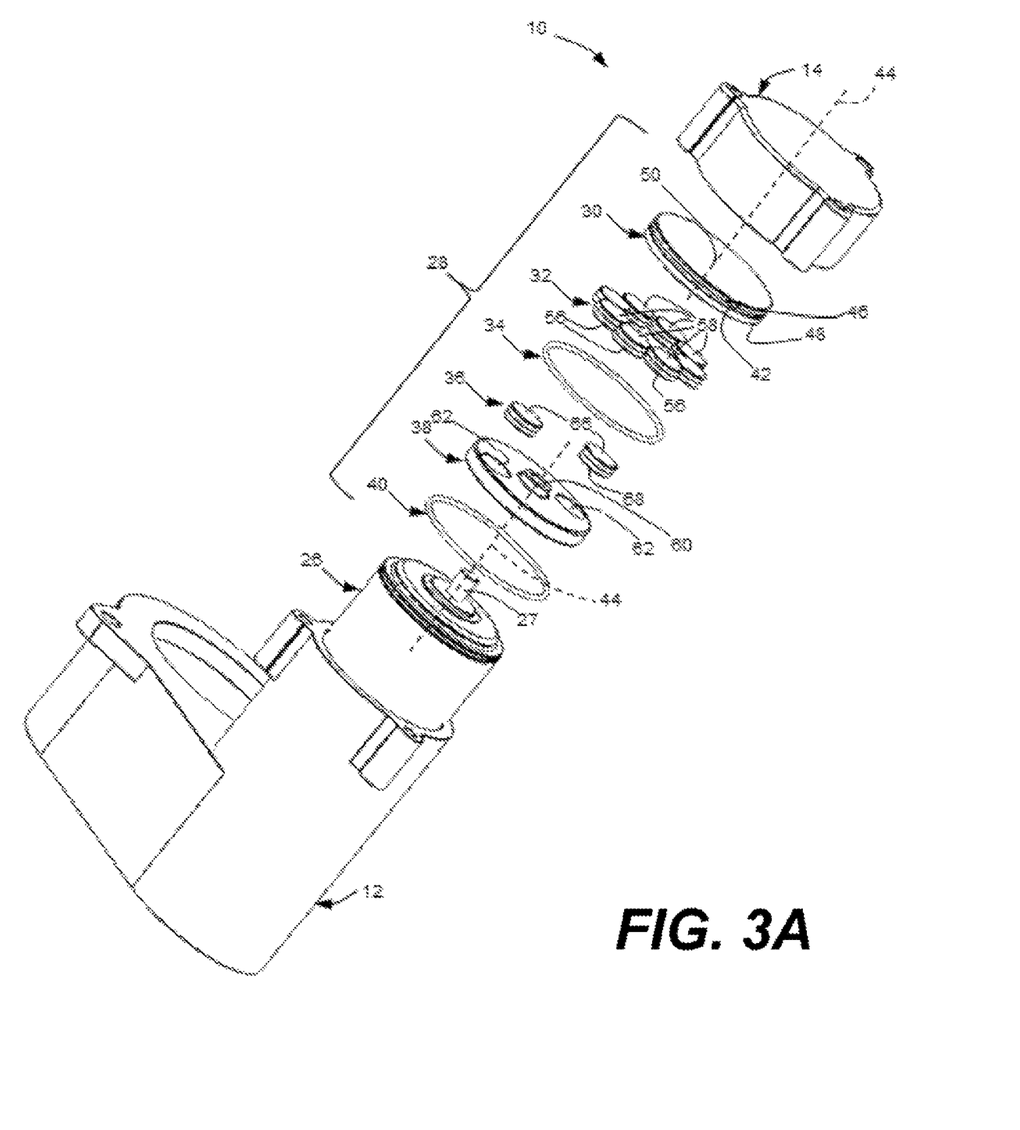
FIG. 3A is an exploded perspective view of the motor assembly.
Figure 3B:
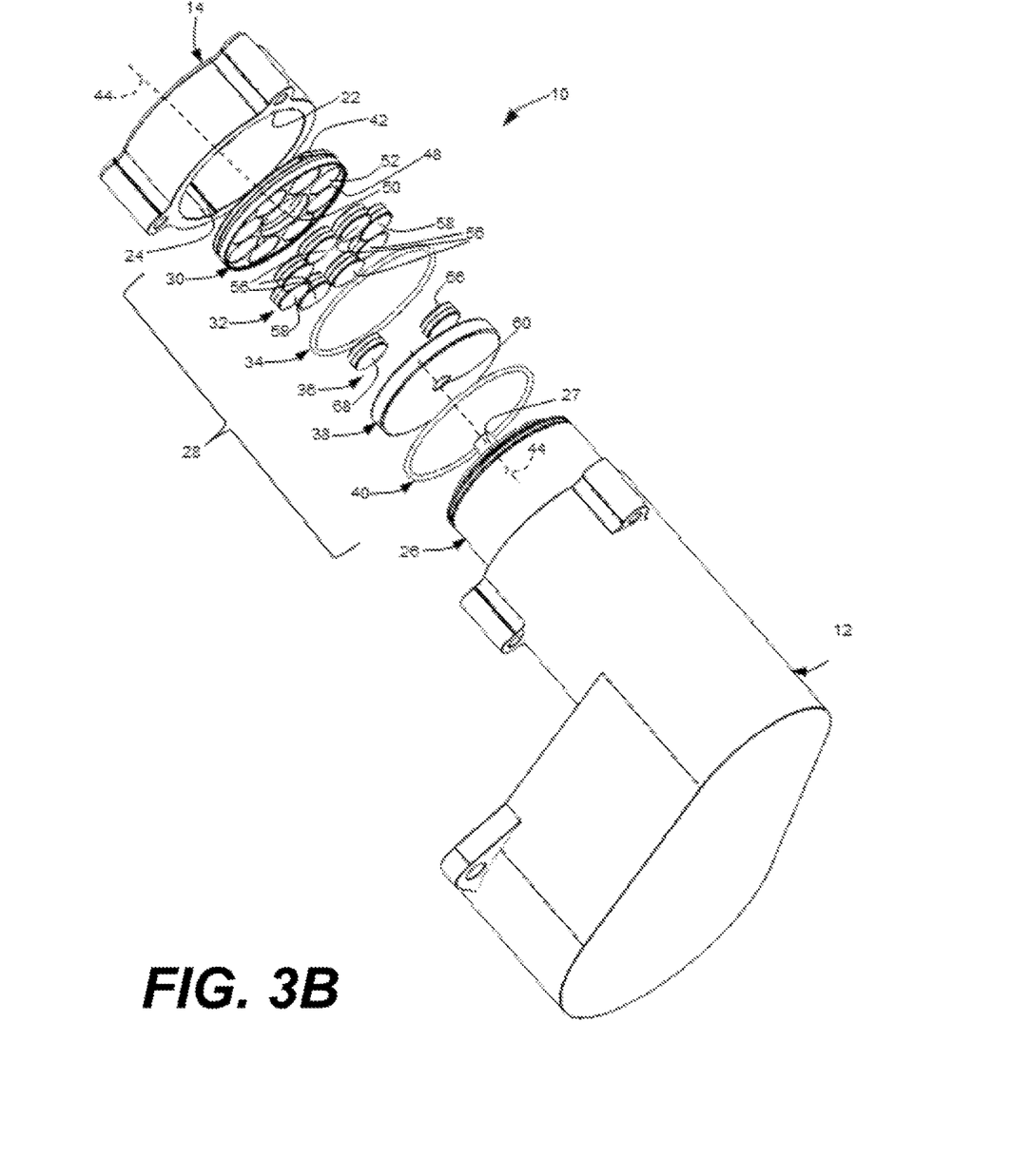
FIG. 3B is an exploded perspective view of the motor assembly.

FIGS. 3A and 3B illustrate the motor gear unit 10. The motor 26 and a magnetic clutch 28 are located between the housing body 12 and the housing cap 14. The motor 26 includes a rotating output shaft 27. The magnetic clutch 28 includes a non-rotating plate 30, non-rotating magnets or disks 32, a first seal 34, rotating magnets or disks 36, a rotating plate 38, and a second seal 40.

Figure 4:
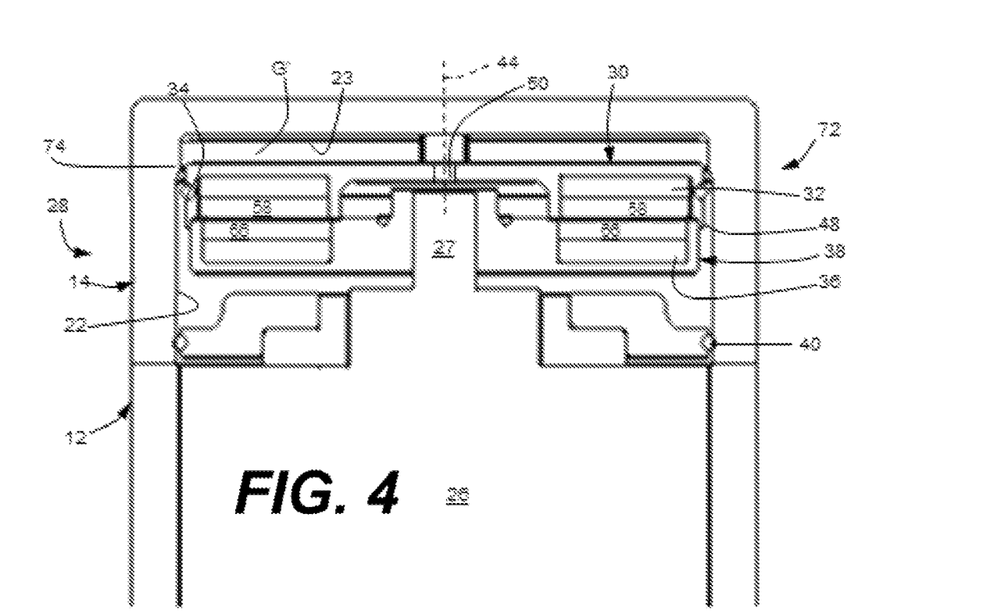
FIG. 4 is a cross-sectional view of the motor assembly of FIG. 2 taken along line 4,5 with a magnetic clutch in an engaged position.

With reference to FIGS. 3A, 3B. 7 and 9, the non-rotating plate 30 includes anti-rotation features 42 engaging anti-rotation grooves 24 on an inner wall surface 22 of the housing cap 14. The anti-rotation features 42 cooperate with the anti-rotation grooves 24 to restrict the non-rotating plate 30 from rotating about a longitudinal axis 44 of the motor gear unit 10. The anti-rotation features 42 cooperate with the anti-rotation grooves 24 so that the non-rotating plate 30 can axially move along the longitudinal axis 44. The non-rotating plate 30 includes a groove 46 extending around a circumference thereof for engaging the first seal 34. The non-rotating plate 30 includes a lip 48 for engaging at least a portion of the rotating plate 38 when the magnetic clutch assembly 28 is in an engaged position 72 (FIG. 4). The non-rotating plate 30 includes an orifice 50 and magnet seats 52 (eight shown). Each magnet seat 52 receives one non-rotating magnet or disk 32. Each non-rotating magnet 32 includes a north pole 56 and an opposing south pole 58. Non-rotating magnets or disks 32 (six shown) are positioned in the magnet seats 52 (six shown) so that the north poles 56 face the rotating plate 38. Non-rotating magnets 32 (two shown) are positioned in the magnet seats 52 (two shown) so that the south poles 58 face the rotating plate 38. Alternatively, or in combination, one or two ferromagnetic metal disks 32 are positioned in two of the magnetic seats 52.

With reference to FIGS. 3A, 3B, the rotating plate 38 includes a center bore 60 engaging the output shaft 27 of the motor 26. The rotating plate 38 is configured to rotate with the output shaft 27 about the longitudinal axis 44. The rotating plate 38 includes magnet seats 62 (two shown). Each magnet seat 62 receives a rotating magnet 36. Each rotating magnet 36 includes a north pole 66 and an opposing south pole 68. The rotating magnets 36 are positioned in the magnet seats 62 so that the north poles 66 face the non-rotating plate 30. The second seal 40 is located between the rotating plate 38 and the motor 26.

Figure 5:
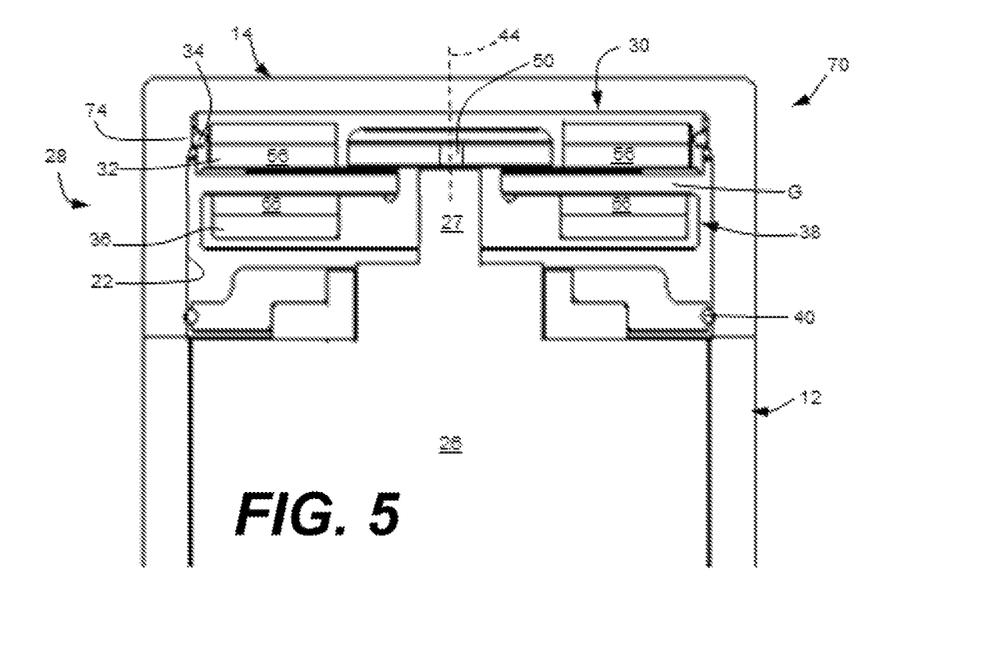
FIG. 5 is a cross-sectional view of the motor assembly of FIG. 2 taken along line 4,5 with the magnetic clutch in a non-engaged position.
Figure 6:
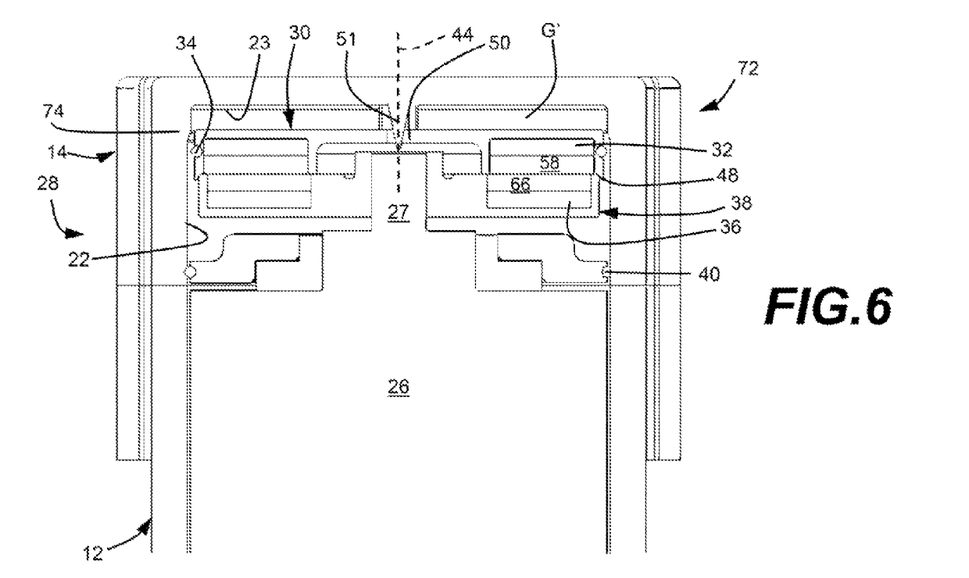
FIG. 6 is a cross-sectional view of the motor assembly of FIG. 2 taken along line 4,5 with a magnetic clutch in an engaged position.

FIGS. 4 and 6 illustrate the magnetic clutch assembly 28 in the engaged position 72. In the engaged position 72, the non-rotating plate 30 engages the rotating plate 38. In the engaged position 72, the north poles 66 of the rotating magnets 36 in the rotating plate 38 are magnetically attracted to the south poles 58 of the non-rotating magnets 32 in the non-rotating plate 30 that face the rotating plate 38. Alternatively, or in combination, the rotating magnets 36 in the rotating plate 38 are magnetically attracted to the ferromagnetic metal disks 32 in the non-rotating plate 30. The magnetic attraction therebetween causes the non-rotating plate 30 to axially move along the longitudinal axis 44 from a non-engaged position 70 (FIGS. 5, 7, and 8) to the engaged position 72. In the engaged position 72, the lip 48 of the non-rotating plate 30 engages at least a portion of the rotating plate 38. In the engaged position 72, the output shaft 27 and/or the motor 26 is rotationally locked and/or restricted from rotating (i.e., the output shaft 27 is restricted from back driving). In the engaged position 72, the brake pads 106, 108 can be moved relative to the rotor (i.e., the brake pads 106, 108 are either pushed against the rotor or retracted away from the rotor). An air chamber G' is located between non-rotating plate 30 and an inner cap surface 23. In the engaged position, the orifice 50 is at least partially open and may even be fully open (i.e., the spike 51 extending from the inner cap surface 23 does not fully seal against the walls of the orifice 50).

Figure 7:
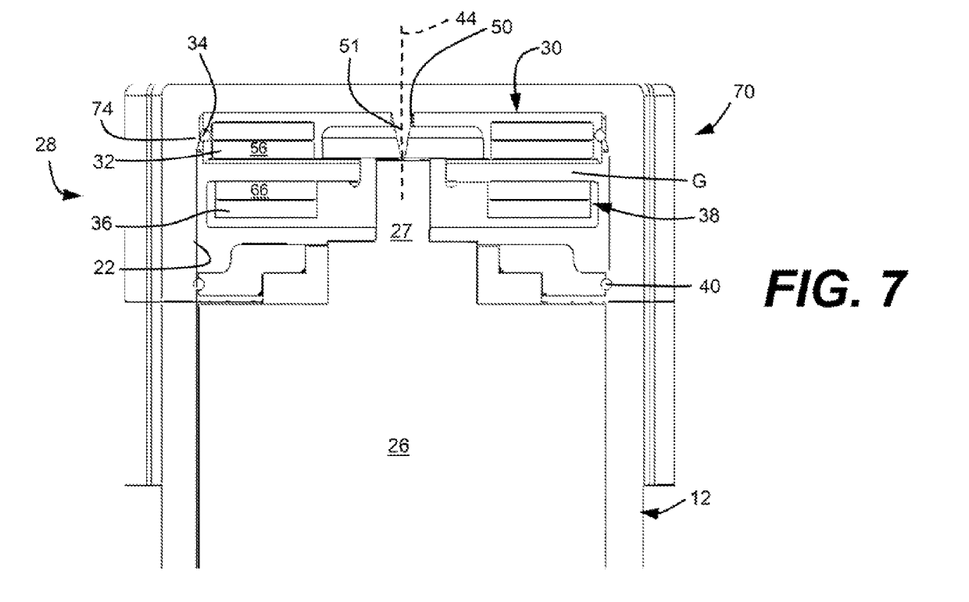
FIG. 7 is a cross-sectional view of the motor assembly of FIG. 2 taken along line 4,5 with the magnetic clutch in a non-engaged position.
Figure 8:
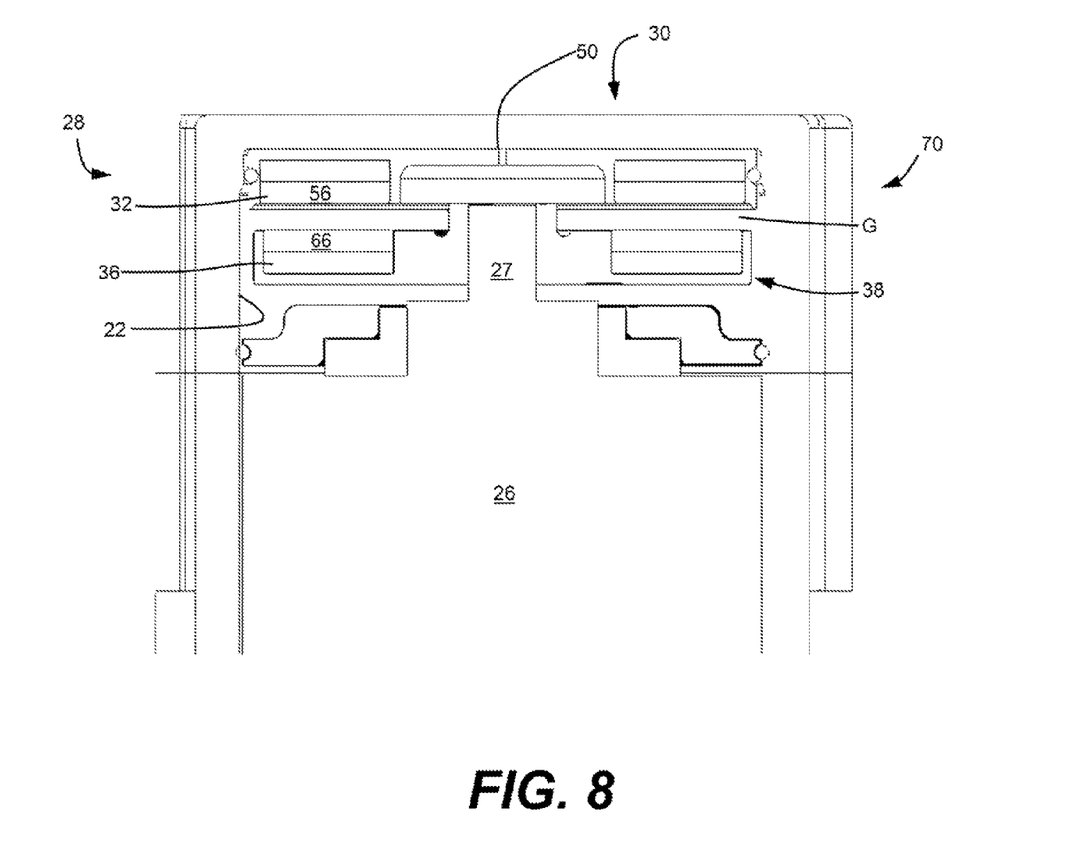
FIG. 8 is a cross-sectional view of the motor assembly of FIG. 2 taken along line 4,5 with the magnetic clutch in a non-engaged position.

FIGS. 5, 7, and 8 illustrate the magnetic clutch assembly 28 in the non-engaged position 70. In the non-engaged position 70, the motor 26 is running and generating a motor output torque that is generally greater than the magnetic attraction force between the opposing poles 58, 66 of the magnets 54, 64 in the non-rotating and rotating plates 30, 38. In this regard, the motor 26 causes the output shaft 27 to rotate, which thus causes the rotating plate 38 to rotate about the longitudinal axis 44. In the non-engaged position 70, the brake pads 106, 108 can be moved towards the rotor or moved away from the rotor. The two rotating magnets 36 in the rotating plate 38 with north poles 66 facing the non-rotating plate 30 magnetically repel the six non-rotating magnets 32 in the non-rotating plate 30 with north poles 56 facing the rotating plate 38. The magnetic repulsion therebetween causes the non-rotating plate 30 to axially move along the longitudinal axis 44 from the engaged position 72 (FIGS. 4 and 6) to the non-engaged position 70 and/or axially maintain the non-rotating plate 30 in the non-engaged position 70. An air gap G is located between the non-rotating plate 30 and the rotating plate 38. The air gap G also restricts the non-rotating plate 30 from engaging the rotating plate 38 while the motor 12 is running. The air in the air gap G is generally maintained and controlled via the orifice 50 so that the non-rotating plate 30 is restricted or prevented from engaging the rotating plate 38 when the motor is running 12. In the non-engaged position, the orifice 50 is almost fully closed or may be fully closed (i.e., the orifice may be fully engaged by the spike 51).

During use, when the non-rotating plate 30 axially moves from the engaged position 72 (FIGS. 4 and 6) to the non-engaged position 70, at least a portion of the air in the air chamber G' moves between the first seal 34 and the inner wall surface 22. At least some of the air also moves through the orifice 50 in the non-rotating plate 30 towards the rotating plate 38 until the non-rotating plate 30 is moved to an axial position along the longitudinal axis 44 where the first seal 34 engages a tapered portion 74 of the inner wall surface 22. When the first seal 34 engages the tapered portion 74, air from the air chamber G' is no longer able to move therebetween. Instead, air from the air chamber G' is moved through the orifice 50 in the non-rotating plate 30 towards the rotating plate 38. While the non-rotating plate 30 moves towards the inner cap surface 23 to the non-engaged position 70, the spike 51 at least partially engages or seals the orifice 51 and restricts the amount of air moved from the air chamber G' towards the rotating plate 38 (See also FIGS. 4 and 6). The spike 51 is conical (FIG. 10) and it may be appreciated that the further the non-rotating plate 30 moves towards the inner cap surface 23, the less air is moved or allowed to move from the air chamber G' towards the rotating plate 38.

Figure 9:
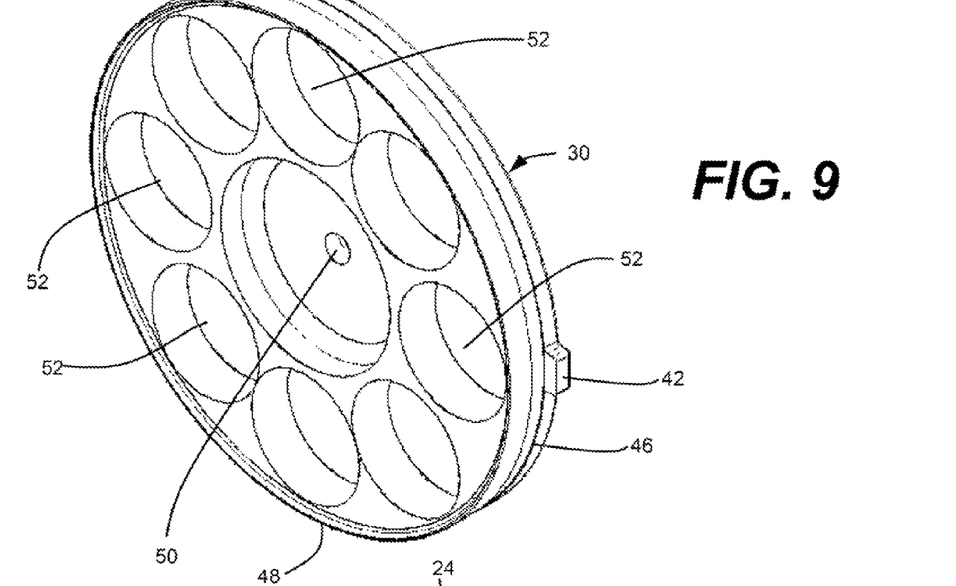
FIG. 9 is a perspective view of a non-rotating plate.

FIG. 9 illustrates the non-rotating plate 30. The non-rotating plate 30 includes anti-rotation features 42 that engage anti-rotation grooves 24 on an inner wall surface 22 of the housing cap 14. The non-rotating plate 30 includes a groove 46 extending around a circumference thereof for engaging at least a portion of the first seal 34. The non-rotating plate 30 includes a lip 48 for engaging at least a portion of the rotating plate 38 when the magnetic clutch assembly 28 is in an engaged position 72 (FIGS. 4 and 6). The non-rotating plate 30 includes an orifice 50 and magnet seats 52 (eight shown). Each magnet seat 52 receives one non-rotating magnet 32.

Figure 10:
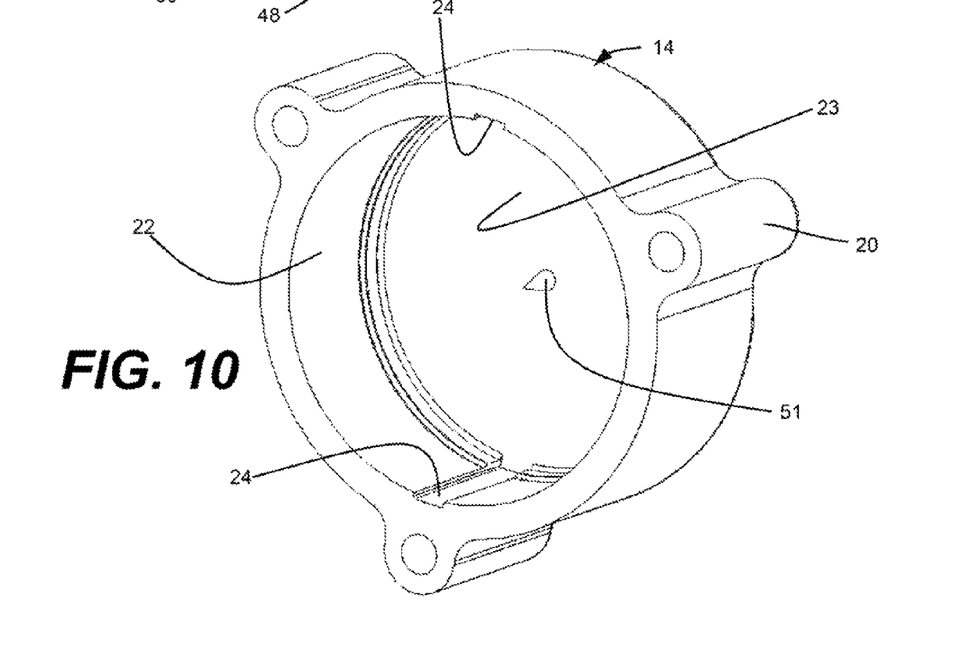
FIG. 10 is a perspective view of a housing cap.

FIG. 10 illustrates the housing cap 14. The housing cap 14 includes cap attachment features 20 for attaching or coupling the housing cap 14 to the housing body 12. The housing cap 14 includes an inner surface 22 with a plurality of anti-rotation grooves 24 engaging the anti-rotation features 42 on the non-rotating plate 30. The housing cap 14 includes a spike 51 extending from an inner cap surface 23.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device for a brake system, the device comprising:
a rotating plate configured to engage an output shaft;
a non-rotating plate that moves axially along an axis of the output shaft between an engaged position and a non-engaged position, the non-rotating plate includes an orifice; and
a housing containing the rotating plate and the non-rotating plate;
wherein in the engaged position, the non-rotating plate moves axially along the axis of the output shaft and into contact with the rotating plate so that rotation of the rotating plate and the output shaft is inhibited;
wherein in the non-engaged position, the non-rotating plate moves axially along the axis of the output shaft and out of contact with the rotating plate so that rotation of the rotating plate and the output shaft is no longer inhibited; and wherein as the non-rotating plate moves from the engaged position to the non-engaged position, air located in an air chamber located between the non-rotating plate and an inner surface of the housing is moved at least partially between the non-rotating plate and the inner surface of the housing and at least partially through the orifice in the non-rotating plate towards the rotating plate so that the air is moved to an air gap between the non-rotating plate and the rotating plate so that the non-rotating plate is substantially restricted from engaging the rotating plate when the non-rotating plate is in the non-engaged position.

2. The device of claim 1,
wherein the housing includes a spike that at least partially engages the orifice as the non-rotating plate moves to the non-engaged position so that the air passing through the orifice can be controlled.

3. The device of claim 2, wherein the non-rotating plate comprises a seal disposed around the non-rotating plate, and
wherein the inner surface of the housing includes a tapered portion for the seal to engage when the non-rotating plate is in the non-engaged position, the seal disengages the tapered portion when the non-rotating plate moves from the engaged position to the non-engaged position so that the air located in the air chamber can move at least partially between the seal and the inner surface of the housing.

4. The device of claim 2, wherein the non-rotating plate includes anti-rotation features engaging corresponding anti-rotation grooves on the inner surface of the housing so that the non-rotating plate is restricted from rotating about the axis.

5. The device of claim 1, wherein the rotating plate includes a number of rotating magnets having a first polarity, the rotating plate also includes one or more magnet seats each of which receive one of the rotating magnets,
wherein the non-rotating plate includes non-rotating magnets, a number of the non-rotating magnets have a first polarity and a number the non-rotating magnets have a second polarity, the non-rotating plate also includes one or more magnet seats, each of which receive one of the non-rotating magnets,
wherein a ratio of the number of the rotating magnets having the first polarity to the number of the non-rotating magnets having the first polarity is greater than a ratio of the number of the rotating magnets having the first polarity to the number of the non-rotating magnets having the second polarity, and
wherein the non-rotating magnets magnetically engage the rotating magnets when the non-rotating plate is in the engaged position.

6. The device of claim 5, wherein:
the ratio of the number of the rotating magnets having the first polarity to the number of the non-rotating magnets having the second polarity is 1:1; and
the ratio of the number of the rotating magnets having the first polarity to the number of the non-rotating magnets having the first polarity is 1:2.

7. The device of claim 1, wherein the non-rotating plate includes a lip engaging at least a portion of the rotating plate when the non-rotating plate is in the engaged position so that the non-rotating plate can inhibit the rotating plate from rotating.

8. The device of claim 1, wherein when the non-rotating plate is in the non-engaged position, one or more brake pads are moved relative to a rotor, and when the non-rotating plate is in the engaged position, the one or more brake pads are restricted from being moved relative to a rotor.

9. A brake system, comprising:
a motor including a rotating output shaft;
a rotating plate attached to the output shaft and including a number of north pole facing rotating magnets;
a non-rotating plate including:
  i. a number of north pole facing non-rotating magnets magnetically repelling the north pole facing rotating magnets;
  ii. a number of south pole facing non-rotating magnets magnetically attracting the north pole facing rotating magnets; and
  iii. one or more anti-rotation features;
a housing containing therein the motor, the output shaft, the rotating plate, and the non-rotating plate, the housing includes anti-rotation grooves that engage the one or more anti-rotation features of the non-rotating plate so that the non-rotating plate is prevented from rotating;
wherein a ratio of the number of the north pole facing rotating magnets to the number of the north pole facing non-rotating magnets is greater than a ratio of the number of the north pole facing rotating magnets to the number of the south pole facing non-rotating magnets;
wherein when the output shaft rotates the rotating plate and the north pole facing rotating magnets align with the north pole facing non-rotating magnets, the repelling forces between the north pole facing rotating magnets and the north pole facing non-rotating magnets cause the non-rotating plate to move away from the rotating plate into a non-engaged position, and
wherein when the output shaft rotates the rotating plate and the north pole facing rotating magnets align with the south pole facing non-rotating magnets, the non-rotating plate moves towards the rotating plate into an engaged position.

10. The brake system of claim 9, wherein the non-rotating plate includes one or more orifices;
wherein as the non-rotating plate moves from the engaged position to the non-engaged position, air located in an air chamber located between the non-rotating plate and an inner surface of the housing is moved at least partially between a seal disposed around the non-rotating plate and the inner surface of the housing and at least partially through the one or more orifices towards the rotating plate;
wherein the housing includes a spike that at least partially engages the one or more orifices as the non-rotating plate moves into the non-engaged position so that an amount of air passing through the one or more orifices can be controlled; and
wherein an air gap is located between the non-rotating plate and the rotating plate when the non-rotating plate is in the non-engaged position so that the non-rotating plate is substantially restricted from engaging the rotating plate when the non-rotating plate is in the non-engaged position.

11. The brake system of claim 10, wherein the inner surface of the housing includes a taper for the seal to engage when the non-rotating plate is in the non-engaged position, the seal disengages the taper when the non-rotating plate moves from the engaged position to the non-engaged position so that the air located in the air chamber can move at least partially between the seal and the inner surface of the housing.

12. The brake system of claim 10, wherein:
the ratio of the number of the north pole facing rotating magnets to the number of the north pole facing non-rotating magnets is 1:2; and
the ratio of the number of the north pole facing rotating magnets to the number of the south pole facing non-rotating magnets is 1:1.

13. The brake system of claim 10, wherein the non-rotating plate includes a lip engaging at least a portion of the rotating plate when the non-rotating plate is in the engaged position so that the non-rotating plate can restrict the rotating plate from rotating.

14. The brake system of claim 10, wherein the rotating plate includes one or more magnet seats each of which receive one of the rotating magnets, and the non-rotating plate includes one or more magnet seats each of which receive one of the non-rotating magnets; and
wherein at least some of the non-rotating magnets engage the rotating magnets when the non-rotating plate is in the engaged position.

15. The brake system of claim 10, wherein the housing is attached to a brake caliper including one or more brake pads and a rotor,
wherein when the non-rotating plate is in the non-engaged position, the one or more brake pads are moved relative to the rotor, and when the non-rotating plate is in the engaged position, the one or more brake pads are restricted from being moved relative to the rotor.

16. A brake system, comprising:
a motor including a rotating output shaft;
a rotating plate that is rotatable by the output shaft, the rotating plate includes a number of north pole facing rotating magnets;
a non-rotating plate including:
  i. a number of north pole facing non-rotating magnets;
  ii. a number of south pole facing non-rotating magnets;
  iii. anti-rotation features;
  iv. an orifice;
a housing containing the motor, the output shaft, the rotating plate, and the non-rotating plate, the housing includes anti-rotation grooves engaging the anti-rotation features of the non-rotating plate so that the non-rotating plate is restricting from rotating,
a brake caliper including:
  i. one or more brake pads;
wherein when the output shaft rotates the rotating plate and the north pole facing rotating magnets align with the north pole facing non-rotating magnets, the non-rotating plate axially moves to a non-engaged position;
wherein as the non-rotating plate moves to the non-engaged, air located in an air chamber between the non-rotating plate and the housing is moved at least partially through the orifice towards the rotating plate;
wherein a spike at least partially engages the orifice as the non-rotating plate moves to the non-engaged position so that an amount of air passing through the orifice can be controlled;
wherein when the north pole facing rotating magnets align with the south pole facing non-rotating magnets, the non-rotating plate axially moves to an engaged position; and
wherein when the non-rotating plate is in the non-engaged position, the one or more brake pads can be moved relative to a rotor, and when the non-rotating plate is in the engaged position, the one or more brake pads are restricted from being moved relative to the rotor.

17. The brake system of claim 16, wherein as the non-rotating plate moves from the engaged position to the non-engaged, the air located in the air chamber between the non-rotating plate and an inner surface of the housing moves at least partially between a seal disposed around the non-rotating plate and the housing.

18. The brake system of claim 17, wherein the inner surface of the housing includes a taper for the seal to engage when the non-rotating plate is in the non-engaged position, the seal disengages the taper as the non-rotating plate moves from the engaged position to the non-engaged position so that the air located in the air chamber can move at least partially between the seal and the inner surface of the housing to an air gap located between the non-rotating plate and the rotating plate.

19. The brake system of claim 16, a ratio of the number of the north pole facing rotating magnets to the number of the north pole facing non-rotating magnets is greater than a ratio of the number of the north pole facing rotating magnets to the number of the south pole facing non-rotating magnets.

20. The brake system of claim 19, wherein:
  i. a ratio of the number of the non-rotating magnets to the number of the rotating magnets is 3:1;
  ii. the ratio of the number of the north pole facing non-rotating magnets to the number of the north pole facing rotating magnets is 2:1; and
  iii. the ratio of the number of south pole facing non-rotating magnets to the number of the north pole facing rotating magnets is 1:1.

* * * * *